Aug. 21, 1945.   H. C. JESSEN   2,383,254
CALCINING PROCESS AND APPARATUS
Filed Aug. 4, 1941   6 Sheets-Sheet 1

INVENTOR.
Heinrich C. Jessen
BY Thiess, Olsen & Mecklenburger
ATTORNEYS.

Aug. 21, 1945.  H. C. JESSEN  2,383,254
CALCINING PROCESS AND APPARATUS
Filed Aug. 4, 1941  6 Sheets-Sheet 3

INVENTOR.
Heinrich C. Jessen.
BY
Thiess, Olsen & Mecklenburger,
ATTORNEYS.

Aug. 21, 1945.　　　H. C. JESSEN　　　2,383,254
CALCINING PROCESS AND APPARATUS
Filed Aug. 4, 1941　　　6 Sheets-Sheet 4

INVENTOR.
Heinrich C. Jessen
BY
Thiess, Olsen & Mecklenburger
ATTORNEYS.

Aug. 21, 1945.	H. C. JESSEN	2,383,254
CALCINING PROCESS AND APPARATUS
Filed Aug. 4, 1941	6 Sheets-Sheet 5
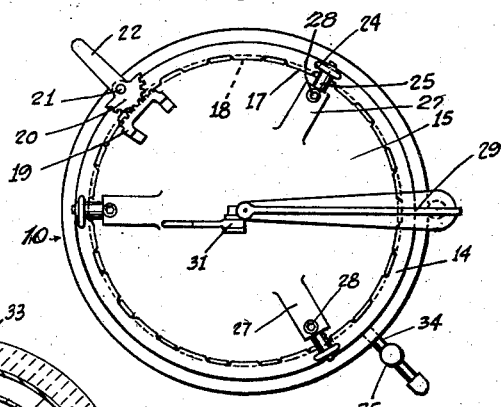
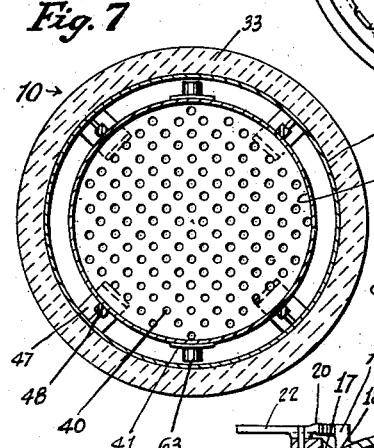
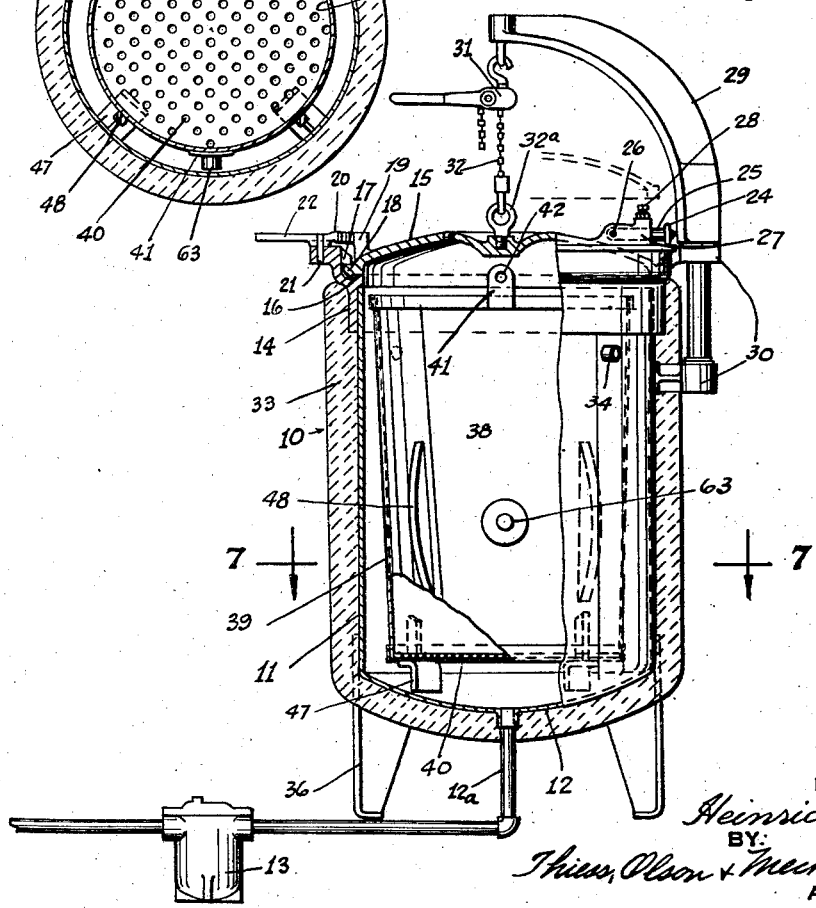
INVENTOR.
Heinrich C. Jessen.
BY
Thiess, Olson & Mecklenburger.
ATTORNEYS.

Aug. 21, 1945.  H. C. JESSEN  2,383,254
CALCINING PROCESS AND APPARATUS
Filed Aug. 4, 1941   6 Sheets-Sheet 6
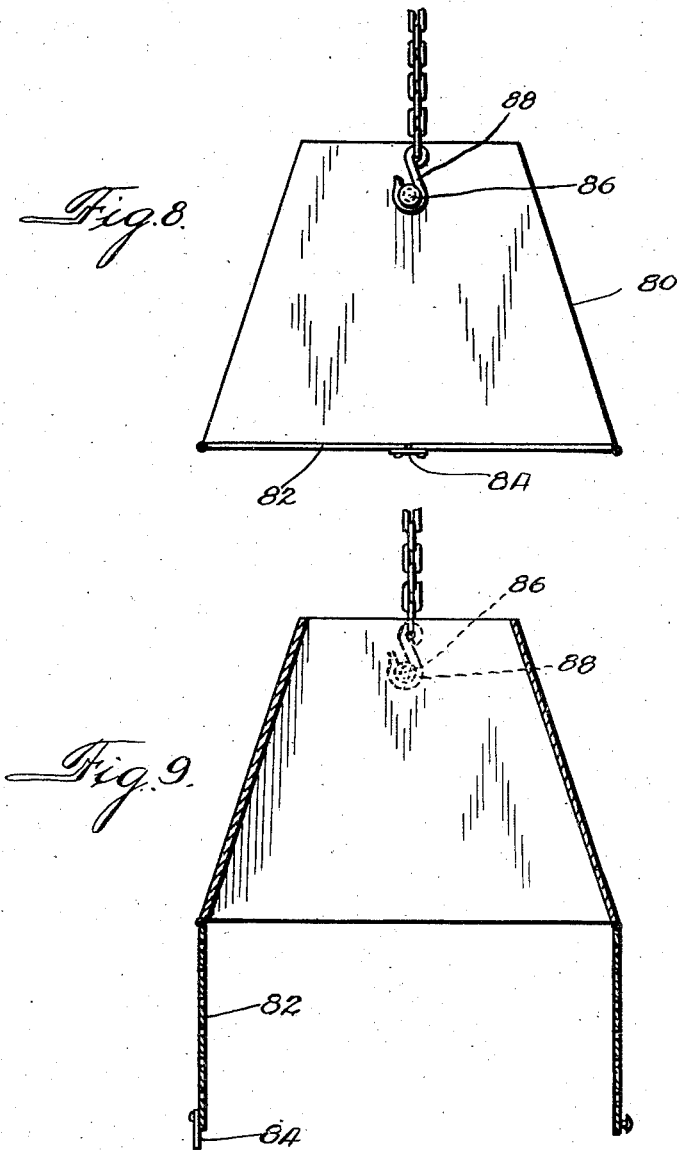
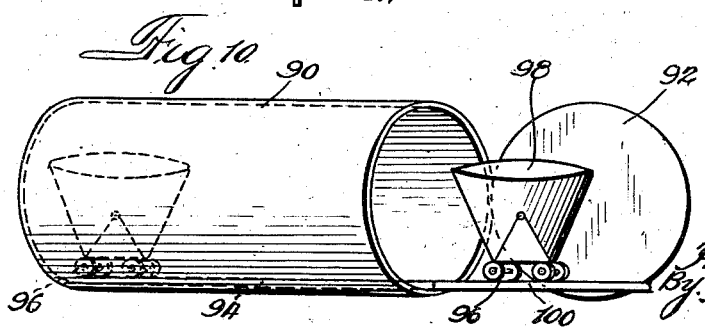

Patented Aug. 21, 1945

2,383,254

UNITED STATES PATENT OFFICE 2,383,254

CALCINING PROCESS AND APPARATUS

Heinrich C. Jessen, Wilmette, Ill., assignor to United States Gypsum Company, Chicago, Ill., a corporation of Illinois Application August 4, 1941, Serial No. 405,364

6 Claims. (Cl. 23—122)

This invention relates to a method and apparatus for calcining inorganic material and more particularly it relates to a method and apparatus for calcining gypsum rock for the production of calcium sulfate hemihydrate.

Various processes and apparatuses have heretofore been proposed for effecting the calcination of natural gypsum rock to calcium sulfate hemihydrate. In Randel and Dailey Patent No. 1,901,051, issued March 14, 1933, and Randel and Dailey Patent No. 1,931,240, issued October 17, 1933, there has been disclosed a new type of calcium sulfate hemihydrate which had theretofore been unknown. This product is known as alpha gypsum and may be prepared by the calcination of gypsum rock at elevated temperature and under steam pressure. In McNeil Patent No. 1,897,394, issued February 14, 1933, and Randel, Dailey and McNeil Patent No. 2,074,937, issued March 23, 1937, have been disclosed processes and apparatuses for producing alpha gypsum by a pressure calcination process. These patentees contemplated a vertical cylindrical calciner or calcination chamber for receiving lump rock gypsum which was calcined therein for several hours under steam pressure. It has been found that pressure calcination has a tendency to cause the lumps of calcined gypsum to adhere together. Reciprocating agitator devices have been proposed to break up the mass of lump calcined gypsum to permit the lumps to flow out through the bottom discharge gate of the calciner. These agitating devices have not been entirely successful and sometimes it is necessary to resort to hammering the calciner shell to loosen the lumps and to induce them to flow out through the discharge gate. This hammering of the shell eventually causes breakage and failure of the steel, making replacement of the shell necessary.

An object of this invention, therefore, is to provide a method of and apparatus for the pressure calcination of gypsum or other inorganic material in which difficulties in discharging the pressure calcination apparatus are avoided.

A further object of this invention is the provision of a method of and apparatus for the semicontinuous production of calcined gypsum.

A further object of this invention is the provision of a method of and apparatus for the production of alpha gypsum which may be carried out with a minimum of labor and equipment.

Further and additional objects will appear from the following description, the accompanying drawings, and the appended claims.

In accordance with one embodiment of this invention, an apparatus has been provided which comprises one or more steam pressure calciners or calcination chambers into which an intact body of material to be calcined may be introduced and subsequently removed without the necessity of discharging it through a bottom discharge orifice in the chamber. Each calciner comprises an upright shell portion having means for supplying steam thereto under pressure and a removable cover which may be secured thereto to permit a desired steam pressure to be built up therein. The cover is constructed so that it may be completely removed from over the top of the chamber in order to permit a bucket or basket containing the desired gypsum rock charge to be passed into and subsequently removed from the calcining zone. In operation, the bucket or basket is charged with raw gypsum rock and lowered into the calciner. The calciner cover is then secured in place and steam is passed into the calcination chamber at elevated pressures for several hours in order to effect desired calcination of the gypsum rock. After the calcination has been completed, the cover is removed from the calciner and the bucket or basket containing the calcined gypsum is lifted out of the chamber and the contents of the bucket or basket may be discharged to any desired point. In accordance with one embodiment of this invention, it is preferable to provide a plurality of the calciners briefly described above so that one of them may be discharged and recharged while calcination is being effected in the remaining of them.

For a more complete understanding of this invention, reference will now be had to the drawings, in which Fig. 1 is a diagrammatic elevational view of a calcining plant constructed in accordance with one embodiment of this invention indicating in a general way the steps involved in the treatment of the material;

Fig. 5 is a broken central sectional elevation through a calcination chamber and bucket constructed in accordance with one embodiment of this invention;

Fig. 6 is a plan view of the calciner shown in Fig. 5;

Fig. 7 is a sectional plan view through the calciner and bucket taken on the line 7—7 of Fig. 5;

Fig. 8 is an elevation of a modified form of bucket or basket;

Fig. 9 is a sectional elevation through the bucket shown in Fig. 8 in which the bottom discharge doors have been swung open; and Fig. 10 shows a modified form of calcination chamber and buckets which may be used in accordance with another embodiment of this invention.

Figure 1:
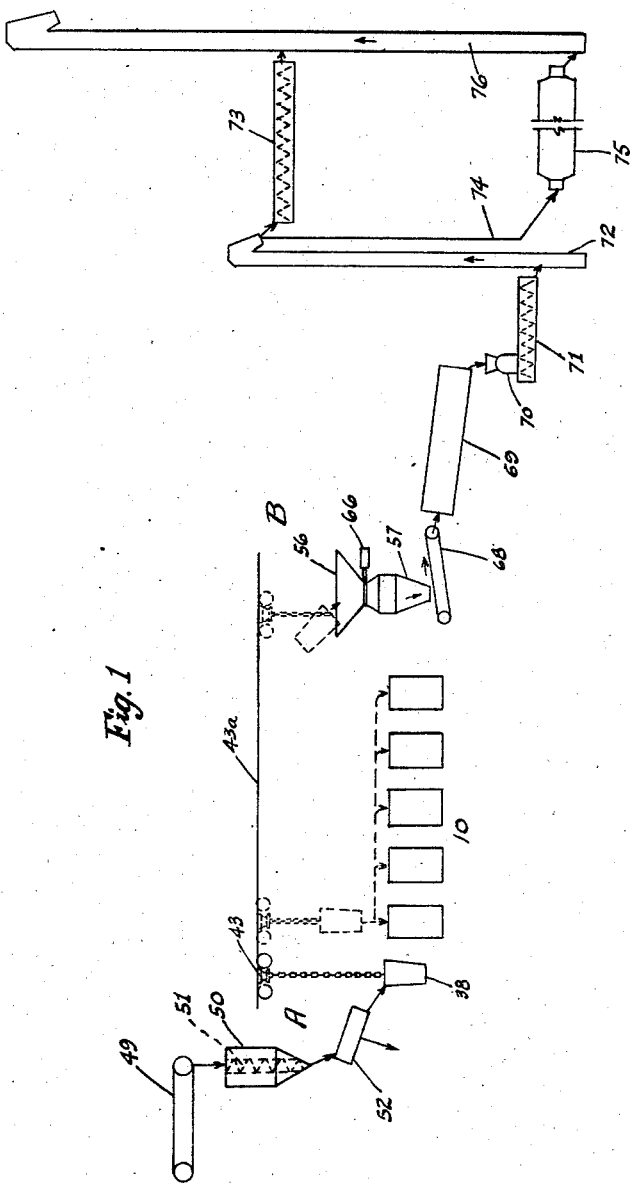

The improved apparatus constructed in accordance with one embodiment of this invention comprises (see Figs. 1 and 2): a plurality of calciners or calcination chambers 10 which are preferably arranged in two parallel spaced rows directly underneath a suspended track 43a, a loading station A for charging buckets 38 with raw rock gypsum for the calciners, a delivery station B for discharging the calcined product from the buckets 38, and an overhead crane 43 for lifting and moving the buckets from the calciners and delivering them to and from the loading station and the delivery station.

Referring now more particularly to Figs. 5, 6 and 7, each calciner or calcination chamber 10 comprises a cylindrical shell 11 having a downwardly curved bottom portion 12 provided with an external insulation 33. A drainpipe 12a controlled by a trap 13 is connected to the bottom 12 and an inlet steam pipe 34 controlled by valve 35 extends through the side walls of the calciner 10 for introducing live steam thereinto. The shell 11 is provided with legs 36 which serve as a support for the calciner.

As shown in the drawings, a sealing ring 14 is provided around the top of the shell 11 and an upwardly curved removable cover 15 is removably seated thereon. A suitable gasket 16 is provided to effect a steam-tight connection between the cover 15 and the shell 11. The upper edge of the ring 14 is provided with a plurality of inwardly extending lugs 17 which mate with outstanding lugs 18 formed on the outer peripheral edge of the cover 15 whereby the lugs 18 on the cover extend under the lugs 17 on the ring when the cover 15 is in closed and locked position. An arcuate rack 19 is secured to the top edge of the cover 15 and meshes with a segmental gear 20 pivotally mounted on a pivot 21 associated with an upwardly extending portion of the ring 14. A handle 22 is associated with the gear 20 so that when the handle 22 is rocked about the pivot 21, the cover 15 will be caused to rotate in a horizontal plane in the sealing ring 14. The cover 15 is also provided with a plurality of rollers 24, each of which is rotatably mounted on the end of a spindle 25, the inner end of each spindle being pivotally mounted on a pivot 26 which is supported on a cover bracket 27. An adjusting bolt 28 in the bracket 27 provides means for raising or lowering the rollers 24 and the cover 15 supported thereby whereby a steam-tight closure is effected. The rollers 24 roll on top of the ring 14 when the handle 22 is rocked, thereby rotating the cover 15 and moving the lugs 18 underneath the inwardly extending lugs 17 positioned on the ring 14 whereby a tight closure is effected.

In order to completely remove the cover 15 from over the top of the calciner 10, an arcuate crane 29 is provided which is pivotally mounted in brackets 30 on the shell 11 and is provided with a chain hoist 31 connected by a chain 32 to an eye bolt 32a on the cover 15 so that the cover 15 may be elevated above the shell 11 and the ring 14 and swung to one side of the shell.

A bucket or basket 38 is provided for each of the calciners 10, said bucket being provided with a slightly upwardly flaring wall 39, a perforated bottom 40 for permitting steam and water to pass readily therethrough, and a pair of diametrically opposed support ears 41 each of which has a hook-receiving hole 42. Brackets 47 are provided on the inside of the shell 11 to engage the bottom of the bucket 38 and to support the same when the latter is positioned within the calciner. Spacer flanges 48 are provided on the bucket in order to center the bucket within the shell 11. Extending outwardly from the side walls 39 of the bucket and between the spacer flanges 48 are a pair of diametrically opposed trunnions 63. These trunnions are positioned somewhat less than half way up the sides of the bucket and are used to assist in dumping the same, as will be hereinafter more fully described.

Referring now more particularly to Figs. 1 to 4, an overhead crane 43 carried on a track 43a is provided having a chain-suspended bucket bail 44. Chains 45 having hooks 46 are suspended from the outer ends of the bail 44 and the hooks 46 are adapted to engage in the holes 42 of the upwardly extending ears 41 mounted on the side walls of the buckets 38. The overhead crane 43 thereby provides means for lifting the buckets 38 into and out of the calcination chambers or calciners 10, after the cover 15 has been removed therefrom as has previously been described and the crane 43 may be operated to deliver the buckets between loading station A and delivery station B.

Figure 2:
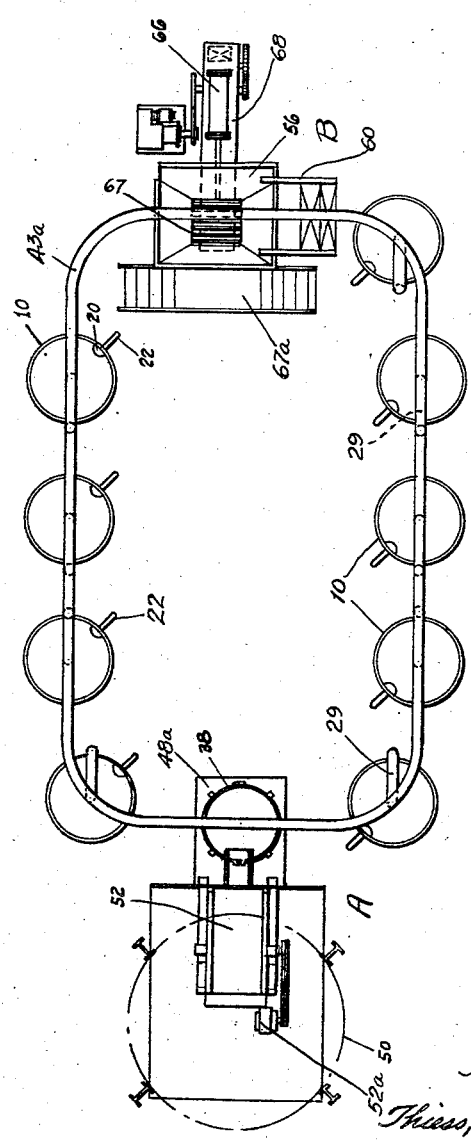
Fig. 2 is a semi-diagrammatic plan view of a portion of the calcining apparatus indicated generally in Fig. 1.
Figure 3:
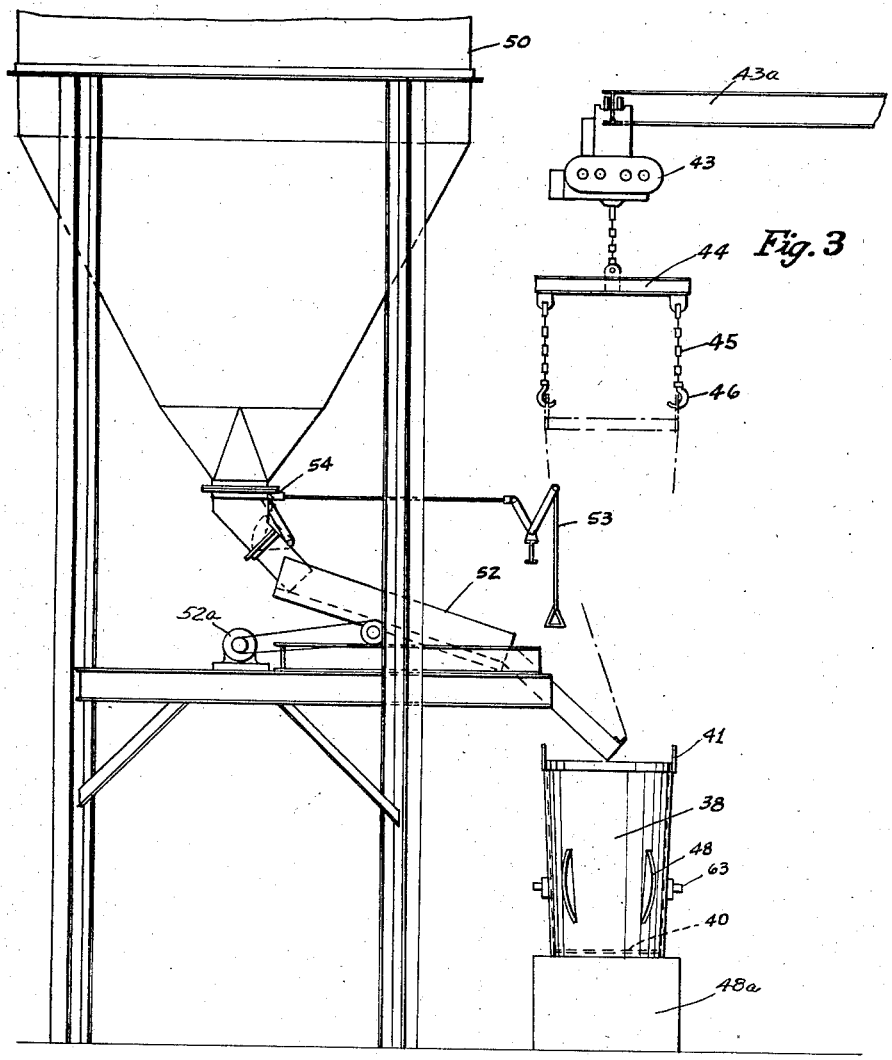
Fig. 3 is an elevation of the feeding end of the apparatus constructed in accordance with one embodiment of this invention.

Referring now more particularly to Figs. 1 to 3, the buckets or baskets 38 may be charged with a raw gypsum rock at loading station A. An empty bucket 38 is deposited at loading station A on a platform 48a by the overhead crane 43. Gypsum rock from crushing and screening operations is carried by a belt 49 to a rock storage bin 50 having a spiral inlet duct 51 for gently depositing the lump rock in the bin 50 without the production of fines due to falling of the lumps. The bin 50 discharges onto a vibrating screen 52 operated by a motor 52a which removes last traces of fines which latter have a tendency to cause lumps of the product to adhere together after calcination. The vibrating screen 52 is positioned so that the screened rock, free from fines, is discharged from the screen into the bucket 38 positioned on the platform 48a. A suitable control linkage 53 is provided to open and close a gate 54 in the bottom of the bin 50, so as to control the flow of rock to the screen 52 and into the bucket 38.

Figure 4:
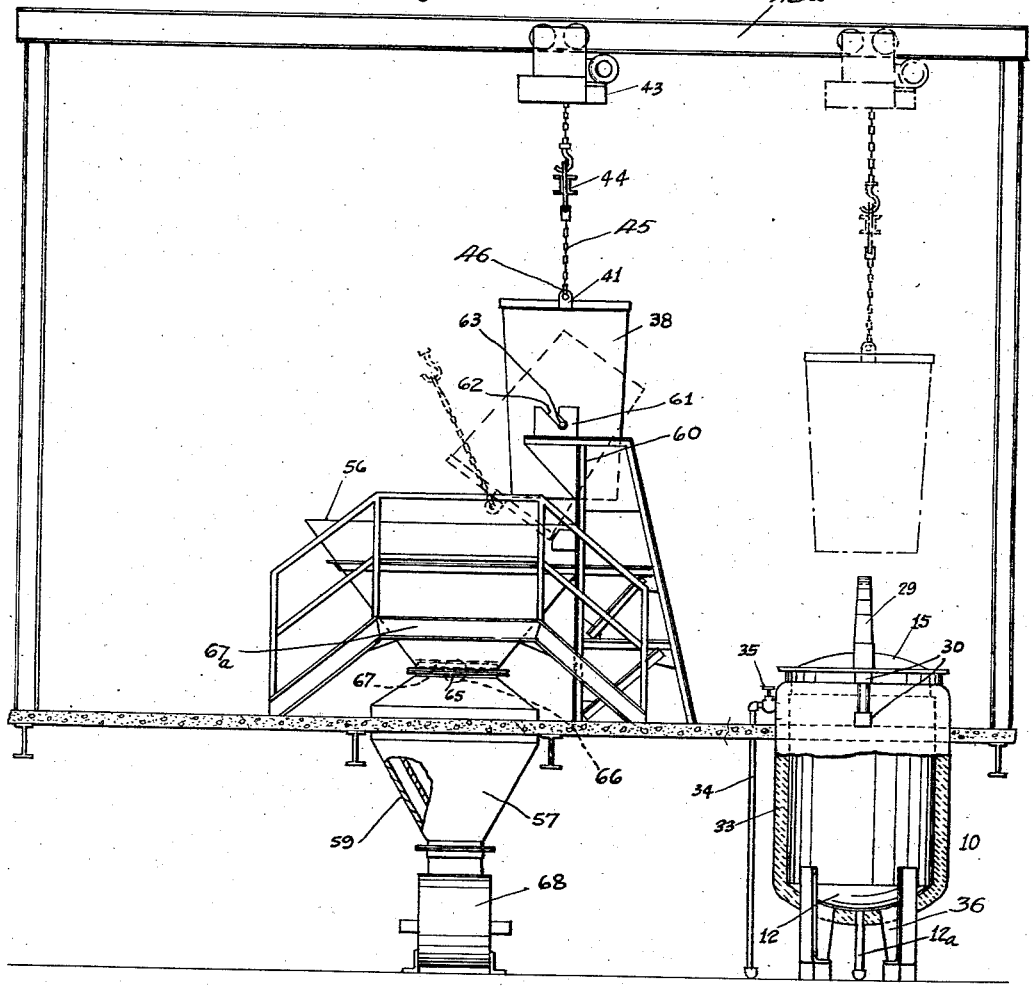
Fig. 4 is a sectional elevation showing the delivery end of the apparatus.

Referring now to Figs. 1, 2 and 4, showing the discharge station B, a dumping hopper 56 is mounted on top of a calcined rock storage bin 57 which has a steam jacket 59 to maintain the steam pressure calcined rock dumped from the buckets 38 in a heated condition until it is dry. A suitable framework 60 is arranged above the hopper 56 and a pair of opposed plates 61 are mounted on said framework, each of said plates having a slot 62 for receiving the dumping trunnions 63 secured to each side of each bucket 38. Thus, as a bucket 38 is lowered by the crane 43 over the hopper 56 so that the trunnions 63 engage the slots 62, the bucket 38 tilts downwardly and dumps its contents of calcined rock into the hopper 56. A slide gate 65 between the hopper 56 and the bin 57 is operated by a compressed air cylinder 66 to shut the gate 65 after a dumping operation to keep hot the supply of rock within the bin 57. A grizzly screen 67 above the bin 57 serves to break up any masses of rock that may have been formed during the calcining operation. A walkway 67a is provided adjacent the hopper 56 for the convenience of the operator.

Referring now more particularly to Fig. 1, a conveyor 68 is provided for withdrawing the hot lump calcined rock from the bin 57 and for introducing it into a rotary drier 69 wherein last traces of steam and free water are removed from the hot calcined product. The drier 69 is preferably of the inner tube type to prevent possible further calcination of the gypsum to the anhydrite. A grinding mill 70, screw-conveying means 71 and 73, bucket-conveying means 72 and 76, a duct 74, and a tube mill 75 are also provided for further processing the calcined product as it is withdrawn from the rotary drier 69, as will be hereinafter more fully described.

In the operation of the above described apparatus a crushed gypsum rock from a source of supply is passed over the conveyor 49 to the bin 50 from which it is discharged onto the vibrating screen 52 which removes any fines under about ½ inch in size. The charge, preferably comprising lumps of raw gypsum screened to ½ inch to 2 inches in size, or better ½ inch to 1½ inches in size, is discharged from the vibrator screen 52 into a bucket or basket 38 positioned on the platform 48a at loading station A. In the calcining plant which is now in operation in accordance with the principles of this invention, each of the buckets 38 is large enough to hold about two tons of calcined gypsum. The filled bucket 38 is then lifted from the platform 48a by the overhead crane 43 and deposited within one of the calciners or calcination chambers 10, from which the cover has been previously removed. The cover is then replaced on the calcination chamber as above indicated and tightly sealed thereto by rotating the cover by rocking the handle 22 so that the lugs 18 on the cover fit under the inwardly extending lugs 17 on the ring 14. After the cover has been sealed in place, steam is introduced into the calciner 10 through the steam line 34 by manipulation of the valve 35. The steam pressure is maintained preferably between 15 and 20 pounds gauge pressure for a period of about six hours until calcination of the gypsum rock in the bucket 36 has been effected. Any water of condensation or water liberated from the gypsum undergoing calcination which may have become condensed escapes through the perforations in the bottom of the bucket 38 and passes out of the calcination chamber 10 through the drainpipe 12a which is controlled by the trap 13.

While the first charge in the first calciner is undergoing calcination, similar buckets are filled, as above described, and introduced into other calciners which may be arranged in the manner indicated in Fig. 2. After the calcination has been completed in the first charged calciner, the steam is turned off and the pressure in the chamber is released. The cover 15 is then unsealed by rocking the handle 22 mounted on the shell 15 and the cover is lifted away from the top of the calciner by means of the chain hoist 31 mounted on the arcuate crane 29. The bucket containing the hot calcined gypsum is then removed from the calciner 10 by means of the overhead crane 43 and another bucket containing a fresh charge of uncalcined gypsum rock is introduced into the calciner 10 and the calcination cycle is repeated.

The bucket containing the hot calcined rock is carried by the overhead crane over the top of the dumping hopper 56 and positioned so that the trunnions 63 fit into the slots 62 on the oppositely disposed plates 61 mounted on the framework 60. Inasmuch as the center of gravity of the filled bucket is above the line between the trunnions 63, the bucket will dump by lowering the ball 44 by means of the chain hoist 43. The hot calcined rock is thereby discharged into the hopper 56 and is then discharged through the grizzly screen 67 and the gate 65 into the calcined rock storage bin 57. The calcined rock storage bin 57 is preferably heated by the steam jacket 59 in order to prevent the steam present in the hot calcined rock from cooling and rehydrating the calcined hemihydrate. After the discharge of the hot rock into the hot storage bin 57, the calcined rock is deposited on a belt conveyor 68 and discharged into a rotary drier 69 wherein the excess steam within the main body portion of the hot rock is driven therefrom, thereby producing a dry calcined product. From the rotary drier 69 the lumps of calcined gypsum are discharged into a grinding mill 70 whereafter it is discharged onto a screw conveyor 71, and then to an elevating bucket conveyor 72, and a horizontal screw conveyor 73 to any desired point of use. If desired, instead of passing from the conveyor 72 to the conveyor 73, the ground plaster may descend through a duct 74 to a tube mill 75 where it is ground to a further degree of fineness. An elevating bucket conveyor 76 leads from the tube mill 75 to further processing equipment, such as an air separator, regrinders, apparatus for mixing in additives, etc. The conveyor 76 may connect with the conveyor 73 so that the calcined product may by-pass the tube mill 75 if desired.

It has been found that by using nine calciners with a calcination cycle of 6¼ hours, wherein each bucket contains two tons of calcined rock, the output of the plant is about three tons of calcined plaster per hour. It is preferable to have one more bucket for holding the gypsum than there are calciners so that one bucket may be in the process of being dumped and refilled while all of the calcining chambers are in operation.

In accordance with one embodiment of this invention, the bucket or basket for holding the gypsum in the calciner may be provided with a pair of bottom discharge doors which are hingedly secured to the side walls of the bucket.

Referring now more particularly to Figs. 8 and 9, a bucket is there shown having a substantially square cross-section and upwardly converging side walls 80. The bucket is open at the top and provided at the bottom with a pair of discharge doors 82 which are hingedly engaged with the side walls 80 of the bucket. These bottom doors are preferably perforated in order to permit the passage of steam and water of condensation therethrough and are provided with a suitable latch 84 in order to hold them in closed position whereby a charge of gypsum rock is retained within the bucket when loaded. The latch 84 is constructed so that it may readily be tripped open in order to permit the discharge of the calcined material therefrom. The side walls 80 of the bucket are provided with a pair of oppositely disposed trunnions 86 which are adapted to be engaged by hooks 88 of a suitable chain hoist whereby the bucket may be lifted into and out of the calciners or calcination chambers in the manner hereinbefore described.

In the modification of the bucket shown in Figs. 8 and 9, the bucket has a square or rectangular cross-section in order to provide effective means for hinging the bottom discharge doors 82 to the side walls thereof. If desired the calcination chamber in which a bucket of this type is to be inserted may also be square or rectangular in cross-section. Cylindrical calcination chambers are not necessary because of the relatively low steam pressures under which the gypsum is calcined by the process.

In Fig. 10 is shown still another modification of this invention. A horizontally extending calcination chamber or calciner 90 having a general cylindrical shape is provided with a hinged end door 92 which may provide a pressure-seal for the chamber. Within the calcination chamber 90 is positioned a pair of tracks 94 which are adapted to carry one or more trucks 96, each of which latter serve to support a bucket or basket 98. The buckets 98 may be rolled into the calciner 90 over retractable tracks 100 and onto the track 94 within the calciner. The retractable track 100 is capable of being withdrawn from the opening of the calciner 90 so that the door 92 may be closed and the gypsum rock within the buckets 98 can be calcined in the manner hereinbefore described. It will of course be clear that suitable means may be provided for filling and dumping the buckets 98. The calciner 90 may be constructed to hold only one bucket charged with gypsum rock or it may be constructed to hold any number of them.

The method and apparatus disclosed in this application are very useful for the pressure-calcination of gypsum inasmuch as sticking of the lump material in the calciner is entirely avoided. Furthermore, the hot material in the baskets or buckets may be quickly dumped into the heated receiving bin without loss in temperature so that substantially no cooling of parts of the calcined rock mass is permitted prior to drying. Such cooling before water removal is undesirable because it results in the partial rehydration of the mass, resulting in non-uniformity and lowering of the quality of the product. The type of apparatus used herein also avoids the necessity of providing a tall building for housing of the apparatus as is necessary with others that have been described in the prior art.

It will of course be recognized that the method and apparatus of the present invention may be employed for the treatment of other materials than gypsum rock. For example, under certain conditions it may be employed for calcining materials such as lime or dehydrating various types of salts. It is conceivable also that the process and apparatus may be advantageously employed for drying or otherwise treating materials which have a tendency to retain absorbed water or water of crystallization.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. In an apparatus for producing pressure-calcined gypsum, a calcination pressure chamber having a removable cover at the top thereof, a bucket having a perforated bottom and arranged to be supported within said chamber, means for introducing steam under pressure into said chamber, and means for withdrawing water of condensation from said chamber.

2. In an apparatus for producing pressure-calcined gypsum, a calcination chamber having an open top, a removable cover normally closing the top of said chamber in pressure sealing relationship, a crane for lifting said cover, a bucket having a perforated bottom, said bucket being arranged to fit within said chamber but spaced from the side walls thereof, means for passing steam under pressure into said chamber, and a second crane for moving said bucket into and out of said chamber.

3. In an apparatus for producing pressure-calcined gypsum, a calcination chamber having an open top, a removable closure for said chamber, a perforated bucket in said chamber, means associated with said chamber and bucket for supporting said bucket in spaced relation to the walls of said chamber, means for introducing steam into said chamber, means for withdrawing water of condensation from said chamber and means for lifting said bucket from said chamber.

4. A process of pressure-calcining a body of gypsum rock which comprises supporting said body in an individual container, introducing said body and said container into a calcination zone, supplying steam under pressure to said calcination zone whereby said gypsum rock is calcined, thereafter removing said body of calcined gypsum rock in said individual container from said calcination zone, removing said calcined gypsum rock from said individual container into a drying zone wherein steam and moisture are separated from the hot calcined gypsum rock and finally comminuating the hot calcined product.

5. A process of calcining a body of gypsum rock which includes the steps of removing fines from the rock to be calcined; loading the resulting rock into a receptacle; transporting the receptacle and rock bodily into a calcination zone; introducing steam under pressure into said calcination zone for a time to effect uniform calcination of said gypsum rock; removing said calcined gypsum rock and said receptacle bodily from said calcination zone; discharging said calcined rock from said receptacle while still hot into a heating zone whereby steam is expelled from the rock to prevent rehydration thereof during subsequent cooling; and finally comminuting the resulting mass to produce a finely divided, uniformly calcined product.

6. In an apparatus for producing pressure-calcined gypsum, a calcination chamber having an open top, a removable cover normally closing the top of said chamber in pressure sealing relationship, a bucket disposed within said chamber, said bucket having a perforated bottom spaced from the bottom of said chamber and having side walls with outwardly and vertically extending flanges secured thereto and in a central portion thereof whereby positively to space said side walls from the walls of the chamber, means for introducing steam into said chamber, means for withdrawing water of condensation from said chamber, and means for lifting said bucket from said chamber through the open top.

HEINRICH C. JESSEN.